Oct. 16, 1928.
F. C. PERKINS
VIBRATION METER
Filed July 25, 1927
1,687,507
2 Sheets-Sheet 1
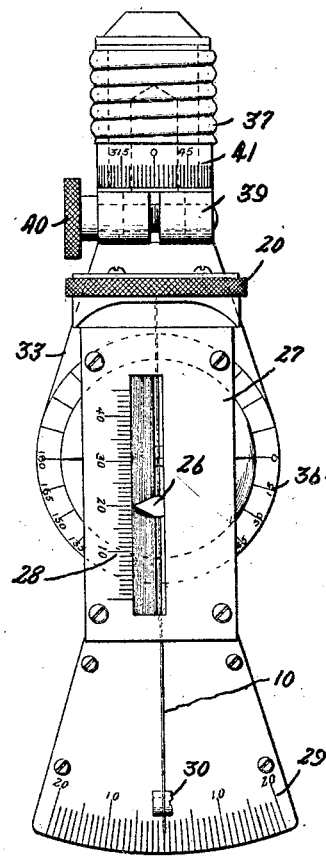
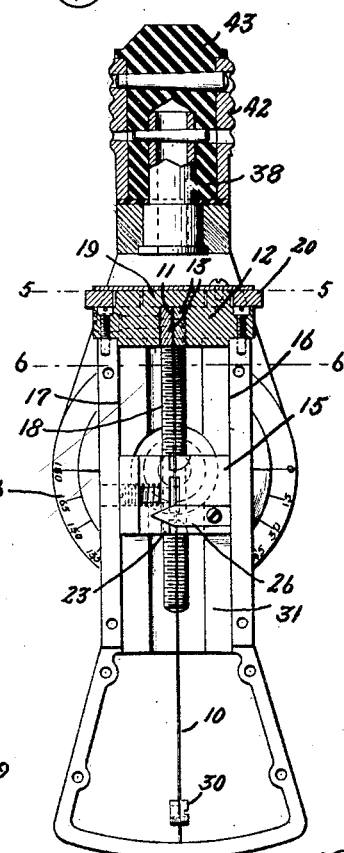
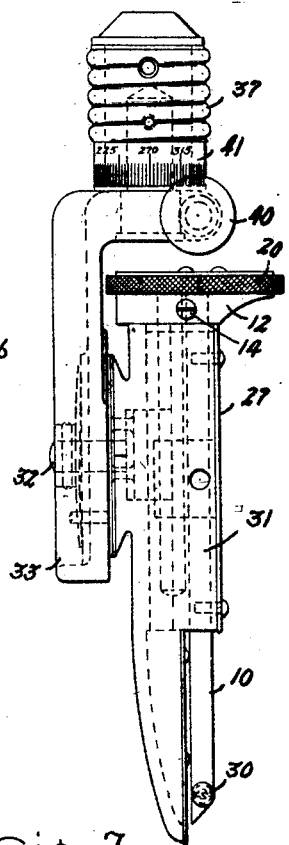
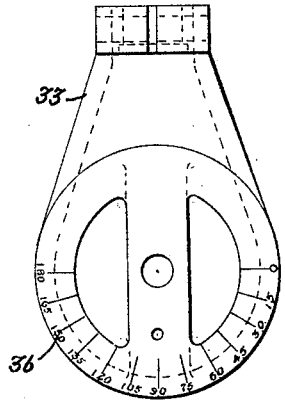
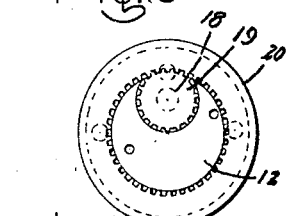
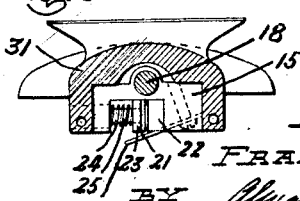
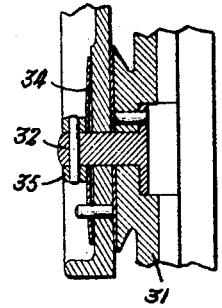
INVENTOR:
FRANK C. PERKINS,
BY
HIS ATTORNEY

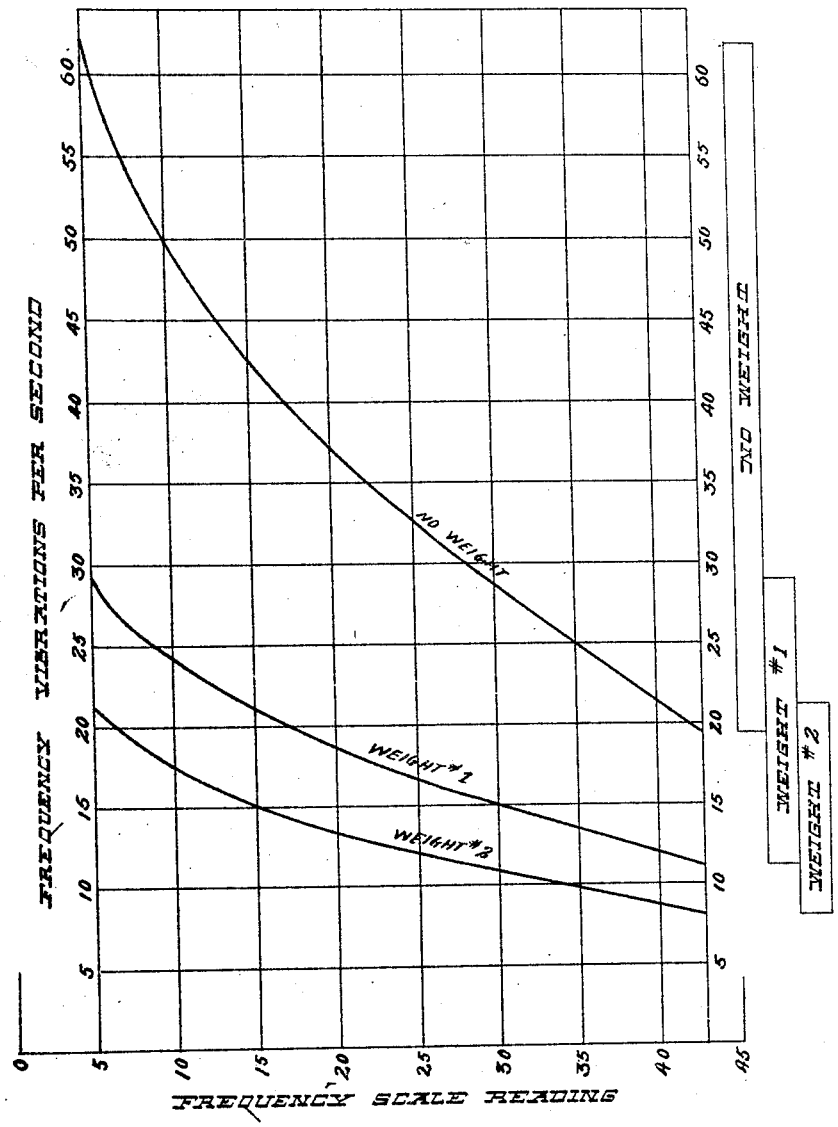

Patented Oct. 16, 1928.

1,687,507

UNITED STATES PATENT OFFICE.

FRANK C. PERKINS, OF SOUTH EUCLID, OHIO, ASSIGNOR TO GENERAL ELECTRIC COMPANY, A CORPORATION OF NEW YORK.

VIBRATION METER.

Application filed July 25, 1927. Serial No. 208,104.

My invention relates to vibration meters or vibrometers, and more particularly to the reed type thereof. One of the principal features of my invention is that my device is a compact, light construction and the parts are so mounted and adjustable that the vibrations of the reed in the vertical, horizontal or intermediate planes may be accurately and conveniently measured. Another feature is that the range of frequencies of the device may be varied. One application of my invention is to the determination of the vibrations to which incandescent lamps and similar devices are subjected. For this purpose, it is convenient to provide the device with a base similar to that of an incandescent lamp although it will be obvious that various other bases and mountings may be used when the device is used for other purposes. Other features and advantages of my invention will appear from the following description of a species thereof and the accompanying drawing.

Fig. 1 is a front elevation of a device embodying my invention and having an incandescent lamp type of base; Fig. 2 is also an elevation thereof partially in vertical section; Fig. 3 is a side elevation; Fig. 4 is an elevation of a detail; Fig. 5 is a plan on the line 5—5 of Fig. 2; Fig. 6 is a horizontal section on the line 6—6 of Fig. 2; Fig. 7 is a partial central longitudinal vertical section; and Fig. 8 is a calibration curve or table used in connection with my device.

As shown in the drawing, the device comprises the reed 10 which may be of thin spring steel and is removably anchored at its upper end 11 in a block 12 being clamped between two blocks 13 contained in a recess in the block 12 and held by a screw 14. A sliding fulcrum block 15 operating in guides 16—17 is threaded upon a shaft 18 carrying at its upper end a pinion 19. The external teeth of said pinion mesh with the internal teeth on the arbor 20 which is supported on the block 12. The rotation of the arbor 20 causes the fulcrum block to be moved upwardly or downwardly. The said block carries a fulcrum consisting of a clamp 21 comprising a stationary member 22 and a movable member 23. The latter is pressed into engagement with the reed by the spring 24 which encircles a pin 25. The fulcrum block also carries the indicator 26. The cover plate 27 has a vertical scale 28. The vertical scale 28 is in arbitrary units and, as shown, indicates the exposed length of the reed in millimeters which may be translated into frequencies by reference to the curve or table shown in Fig. 8. The construction is such that the reed fulcrum constituted by the clamp 21 may be moved so that the effective length of the reed may be varied. The amplitude of vibration is indicated on the cover plate scale 29. A weight 30 may be attached to the end of the reed 10. By substituting other weights it is possible to obtain a wide range of frequencies with a single reed. The casing 31 supporting and containing the aforesaid parts carries a stud 32 and is pivotally mounted thereby on a bracket 33. The casing 31 may be turned to any desired angle and is held in any position by the pressure of the spring plate 34 against the collar 35 on said stud. The scale 36 is provided on the front face of the bracket 33 so that the vertical angle of the plane of the reed may be read. The bracket 33 is swivelled to the base 37 being carried on a stud 38 projecting from the said base and adjustably clamped thereon by the split collar 39 having the screw 40 passing therethrough. A scale 41 is provided on the base so that the horizontal angle of the plane of the reed may be read. As shown, the base 37 comprises the screw threaded shell 42 and insulation 43 so that it may be inserted in an incandescent lamp socket and used for the purpose of determining the severity of vibrations to which any given lamp is subjected. By turning the bracket 33, the horizontal angle of the reed may be varied. By turning the casing 31, the vertical angle may be varied. The effective length of the reed may be varied by turning the arbor 20 thus regulating the natural period of the vibrating reed. The natural period may also be varied by changing the weight 30. The amplitude of vibration may be read on the scale 29.

In operation the vibrometer of the type illustrated is screwed into an incandescent lamp socket on which vibration is suspected and the reed 10 adjusted perpendicular to the suspected plane of vibration by means of the swivel adjustments 32 and 39. With no weight on the reed, adjust the slidable fulcrum block 15 vertically by rotating the arbor 20 until the reed vibrates over the scale 29 to the maximum amplitude. The scale 28 then indicates the actual frequency of vibration by reference to the calibration curves shown in Fig. 8. If no vibration of the reed 10 is encountered without the weight, add the weight 30 and repeat. Having found the frequency, the exact directions of the vibration can be determined by rotating the swivel adjustments 32 and 39 until the amplitude is at a maximum. The angular direction with reference to the socket can then be read on scales 36 and 41. The relative amplitude is shown on scale 29.

What I claim as new and desire to secure by Letters Patent of the United States is:

1. A vibrometer comprising a base, a bracket swivelled to said base, a casing pivotally mounted on said bracket and a reed carried by said casing.

2. A vibrometer comprising a base, a bracket swivelled to said base, a casing pivotally mounted on said bracket, a reed fixed at one end in said casing, and a movable fulcrum for said reed.

3. A vibrometer comprising a base, a bracket swivelled thereto so as to allow its rotation in one plane, a casing swivelled to said bracket so as to allow its rotation in a plane at right angles to the first mentioned plane and a reed carried by said casing.

4. A vibrometer comprising a base, a bracket swivelled thereto so as to allow its rotation in one plane, a casing swivelled to said bracket so as to allow its rotation in a plane at right angles to the first mentioned plane, a reed fixed at one end in said casing, a fulcrum mounted in said casing for movement along said reed, and means whereby the location of said fulcrum along said reed may be varied.

5. A vibrometer comprising a base, a bracket swivelled thereto so as to allow its rotation in one plane, a casing swivelled to said bracket so as to allow its rotation in a plane at right angles to the first mentioned plane, and a reed carried by said casing, said bracket and said casing provided with scales whereby the horizontal and vertical angles of the reed and also its amplitude of vibration may be read.

6. A vibrometer comprising a base, a bracket swivelled thereto so as to allow its rotation in one plane, a casing swivelled to said bracket so as to allow its rotation in a plane at right angles to the first mentioned plane, a reed fixed at one end in said casing, a fulcrum mounted in said casing for movement along said reed, and means whereby the location of said fulcrum along said reed may be varied, said bracket and casing provided with scales whereby the horizontal and vertical angles of the reed and also its amplitude of vibration may be read.

In witness whereof, I have hereunto set my hand this 21st day of July, 1927.

FRANK C. PERKINS.